United States Patent [19]

Zekert et al.

[11] 4,432,275
[45] Feb. 21, 1984

[54] NUT BLANCHING APPARATUS

[75] Inventors: Gerhard C. Zekert; Donald K. DeArment, both of Suffolk, Va.

[73] Assignee: Nabisco Brands, Inc., Parsippany, N.J.

[21] Appl. No.: 202,961

[22] Filed: Nov. 3, 1980

[51] Int. Cl.³ .................. A23N 5/00; A23N 5/01; A23N 12/00
[52] U.S. Cl. ....................... 99/625; 99/524; 99/609; 99/618; 99/621; 100/211; 241/230; 241/234; 241/DIG. 30
[58] Field of Search .............. 99/518, 519, 524–526, 99/617–625, 628; 241/227, 230, 234, DIG. 30; 100/211, 212, 160

[56] References Cited

U.S. PATENT DOCUMENTS

| | | | |
|---|---|---|---|
| 1,427,000 | 8/1922 | Lewinski | 99/625 |
| 1,842,909 | 1/1932 | Lewinski | 99/623 |
| 2,143,020 | 1/1939 | Markley et al. | 99/628 |
| 2,699,806 | 1/1955 | Gardner | 99/537 |
| 3,920,191 | 11/1975 | Bradley | 241/DIG. 30 |

Primary Examiner—Philip R. Coe
Assistant Examiner—Timothy F. Simone
Attorney, Agent, or Firm—Richard Kornutik

[57] ABSTRACT

A nut blanching arrangement in which nuts to be blanched are passed between first and second spaced, counter-rotating rollers. Each roller is provided with a plurality of hollow elastic tubular rings extending around its outer circumference. The tubular rings on the first roller are longitudinally aligned with respect to the tubular rings on the second roller such that each four adjacent tubular rings, two on each roller, form an opening through which the nuts pass during the blanching operation. In this arrangement, the nuts passing between the counter-rotating rollers are forced between the grooves of adjacent tubular rings such that the rings encapsulate and compress the nuts as they pass therebetween. The counter-rotating rollers are rotated at slightly different speeds such that during the blanching operation, the slight differential in the roller speeds causes the outer skin of the peanut to peel away from the nut meat.

11 Claims, 5 Drawing Figures

NUT BLANCHING APPARATUS

BACKGROUND OF THE INVENTION

1. Field of the Invention

The present invention relates generally to apparatus for removing skins from edible nuts, and more particularly is directed to an improved nut blanching arrangement which results in a greater through-put of blanched nuts and reduced percentages of split, crushed and unblanched nuts.

2. Description of the Prior Art

The prior art is replete with many different types of nut blanching arrangements, some of which are discussed below. An effective nut blanching arrangement should incorporate a number of different features. In practice, the amount of blanching action required to fully remove the outer nut skins without splitting the nuts varies from one type of nut to another and also varies with respect to the size of the nut and other factors. Excessive abrasive action will result in a higher percentage of split nuts, while insufficient abrasive action will produce incomplete blanching. Accordingly, the blanching apparatus should incorporate some adjustment to vary the parameters of the blanching action. The following is a limited discussion of some types of blanching arrangements disclosed by the prior art.

Lewinski U.S. Pat. No. 1,427,000 discloses a peanut blanching arrangement wherein annular ribs are provided around the circumference of counter-rotating cylinders, and an air-tight yieldable covering is stretched over the ribs. The covering may be constructed of rubber to provide frictional engagement with the peanut skins, and the air pressure within the covering is regulated to control the extent to which the rubber covering grips and yields peanuts passing between the rollers.

Lewinski U.S. Pat. No. 1,842,909 discloses a peanut blanching arrangement wherein peanuts are passed between two counter-rotating rollers, and wherein each roller is provided with a plurality of equally spaced and integrally formed annular ribs. A plurality of rubber rings, which may be formed of a soft sponge rubber, are placed between adjacent ribs. This patent basically discloses an arrangement similar to a peanut blancher which is currently in commercial use wherein the peripheral surfaces of counter-rotating rollers are equipped with two urethane pads, one or both of which may be ribbed so that the nuts are forced between the ribs as they are processed by the blancher.

Markley et al. U.S. Pat. No. 2,143,020 discloses a peanut blanching arrangement wherein peanuts are passed between adjacent endless pressure belts. One belt is formed of rubber or a similar resilient material and includes a succession of longitudinally formed, parallel V-shaped grooves. The second pressure belt may be smooth, or may be longitudinally ribbed also.

Green U.S. Pat. No. 2,558,899 discloses a peanut blanching arrangement wherein a conveyor belt is constructed with a plurality of parallel peanut-carrying troughs spaced across its width. Spring fingers are positioned directly over each trough extending downwardly into the slot, and each finger supports a thin cutting blade adapted to slit the peanuts.

Gardner U.S. Pat. No. 2,699,806 is pertinent to the extent that the reference discloses a peanut blanching arrangement wherein shafts carry in spaced relationship a series of pairs of wheels, each of which is provided at its periphery with an annular cushion of sponge rubber or the like.

Gardner U.S. Pat. No. 2,964,080 illustrates a peanut blanching machine including an endless conveyor having a horizontal top reach extending along a predetermined path and adapted to carry nuts thereon. A rubbing apron is disposed in spaced relation above the reach and the nuts are adapted to be frictionally engaged between the two elements to facilitate removal of the skins. The apron is preferably slightly inclined downwardly toward the reach in the direction of movement thereof to trap the nuts between the apron and reach and increase the frictional pressure thereon.

Hind U.S. Pat. No. 3,131,738 discloses a blanching arrangement having a pair of spaced, counter-rotating rollers. A first roller is a nut conveyor roller, and may be formed of a metal billet such as stainless steel or aluminum which is helically threaded or grooved along its length. The second roller is formed with an abrasive surface thereon, and serves as an abrasion roller.

Shaw U.S. Pat. No. 4,023,478 illustrates a nut blanching arrangement wherein nuts are passed between a stationary plate member and a conveyor drum having double spiralled transporting ribbed members radially arranged around its periphery. In this arrangement the spiral ribs are disclosed as being round metal rods welded to the peripheral surface of the drum.

McFarland U.S. Pat. No. 4,034,665 discloses a peanut blanching arrangement wherein a pair of counter-rotating rollers are mounted in spaced adjacent relationship to receive pistachio nuts therebetween. Each roller has longitudinal grooves defining radially disposed, longitudinally extending teeth.

SUMMARY OF THE INVENTION

The present invention relates to a peanut blanching arrangement, and has for its primary object the construction of a machine that will blanch peanuts in a more efficient manner and in a more economical manner to the extent that only a relatively small amount of peanuts will be broken during the blanching operation.

A more particular object of the present invention is the construction of a roller for a blanching machine having yieldable characteristics of a nature that allow the peanuts to be individually gripped and subjected to a rubbing action in such a manner that the peanuts are held against breaking to a great extent.

Another object of the invention is the construction of a machine having a greater output than similar machines now on the market with additional advantage that a smaller percentage of peanuts are broken.

A further object of the present invention is to provide a particular construction for peanut blanching rollers which subjects each peanut to a yieldable rubbing action that may be accurately controlled to produce improved blanching results.

Still another object of this invention is to provide a nut blanching arrangement that may be readily adjusted to accommodate shelled nuts of various grades, sizes and skin thicknesses.

Yet another object of the present invention is to provide a nut blanching apparatus that is adjustable to blanch various types of shelled nuts at optimum speeds and with a smaller percentage of split or crushed nuts.

In accordance with a preferred embodiment thereof, a nut blanching arrangement is disclosed in which the nuts to be blanched are passed between first and second spaced, counter-rotating rollers. The invention is particularly characterized by the fact that each roller is provided with a plurality of elastic rings extending around its outer circumference. In this arrangement the nuts passing between the counter-rotating rollers are forced between the grooves of adjacent elastic rings such that the rings encapsulate the nuts as they pass therebetween.

In accordance with the teachings herein, the elastic rings are tubular, latex rubber rings, each having an outer diameter between ¼" and ¾" and a wall thickness between 1/16" and ¼", and in one preferred embodiment the latex rings have an outer diameter of 7/16" and a wall thickness of 3/32". Furthermore the tubular rings are held in position around the circumference of each roller by a plurality of grooves formed around its outer circumference, with each groove serving to position one elastic tubular ring therein. Furthermore the grooves of the first roller are longitudinally aligned with the grooves of the second roller such that each four adjacent tubular rings, two on each roller, form an opening through which the nuts pass during the blanching operation. Moreover the distance between the rollers may be adjusted to accurately control the space provided between the elastic rings on the first and second rollers.

In a preferred embodiment the counter-rotating rollers are rotated at slightly different rotational speeds. As the nuts are encapsulated in the groove between adjacent rings, the slight differential in the roller speeds causes the outer skin of the peanut to peel away from the nut meat, and the tubular rings provide a gentle holding action on the nuts because of the ability of their walls to absorb the shock pressures exerted on the nuts by the different roller speeds. This relatively gentle action results in blanching of the peanuts while reducing the percentage of nuts being damaged or split in the blanching area of the machine. Accordingly, the nuts are blanched by a combination of two actions thereon, the first being a compression of the skins between adjacent rollers, and the second being the slight amount of shear caused by the difference in rotational speeds of the top and bottom rollers.

Although the disclosed preferred embodiment utilizes tubular elastic rings around the counterrotating rollers, other embodiments may be constructed with solid elastic rings, and in one embodiment the elastic rings may be coil metal springs extending around the counterrotating rollers.

In the practice of the present invention, the nuts to be blanched are normally subjected to prior conditioning by roasting or drying the outer skins to a moisture content that causes the skins to loosen or slough off, away from the nut meat, by the gentle mechanical rubbing which results from the tubular rings on the top and bottom rollers being driven at slightly different rotational speeds.

BRIEF DESCRIPTION OF THE DRAWINGS

The foregoing and other objects and advantages of the inventive nut blanching arrangement constructed pursuant to the teachings of the present invention may be more readily understood by one skilled in the art having reference to the following detailed description of a preferred embodiment thereof, taken in conjunction with the accompanying drawings wherein identical reference numerals are utilized to refer to like elements throughout the several views, and in which.

DETAILED DESCRIPTION OF THE DRAWINGS

Figure 1:
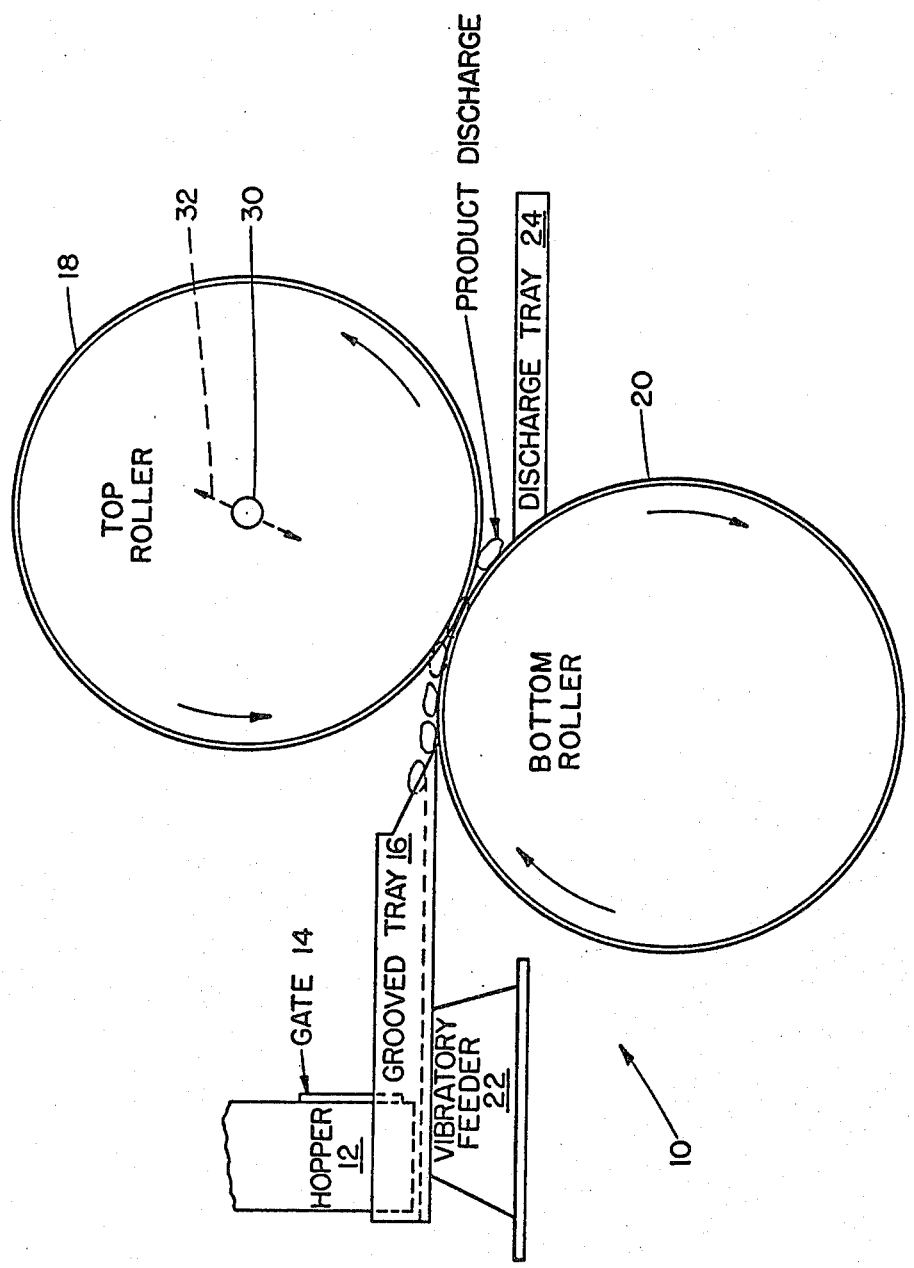
FIG. 1 is an elevational, schematic illustration of a preferred embodiment of the present invention.

Referring to the drawings in detail, FIG. 1 illustrates a somewhat schematic, side elevational view of the major components of the nut blanching arrangement 10 of the present invention. The peanuts to be blanched enter the system through a hopper 12 having a front gate 14 which is opened slightly to allow the peanuts to flow from the hopper into a feed tray 16. The feed tray 16 is grooved in its upper surface, and is adapted to feed the nuts in a properly spaced relationship into a blanching area formed between the outer circumferences of first and second spaced, counter-rotating rollers 18 and 20. The rollers 18 and 20 may be constructed of steel, aluminum or some other suitable material. The feed tray 16 is vibrated by a vibratory feeder unit 22 to assist in the flow of the peanuts from the hopper 12 into individual grooves in the tray 16, then to the blanching area between the rollers 18 and 20. The blanched peanuts are then carried by the bottom roller 20 onto a product discharge device such as a tray 24.

Figure 4:
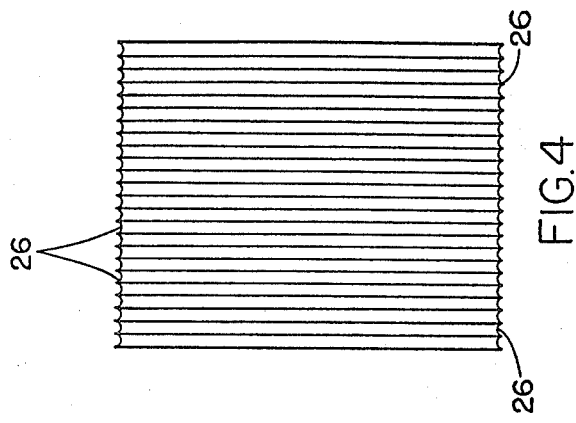
FIG. 4 is a front elevational view of one of the top or bottom rollers with the elastic rings removed therefrom, and illustrates the manner in which the circumference of the roller is grooved to properly position the elastic rings thereon.

The present invention is characterized by the particular construction of the rollers 18 and 20. One of these rollers is shown in a front elevational view in FIG. 4, which illustrates the circumferences as having a plurality of adjacent positioning grooves 26 formed therein, with each groove serving to correctly position a hollow elastic tubular ring 28 extending around the circumference of the roller. The embodiment illustrated in FIG. 4 has twenty-six adjacent grooves 26 formed around the circumference of the roller. Accordingly, the roller of FIG. 4 is adapted to have twenty-six tubular rings wrapped therearound in the twenty-six grooves. Adjacent tubular rings are designed to compress the nuts in the grooves formed therebetween as the nuts pass through the blanching area.

Figure 3:
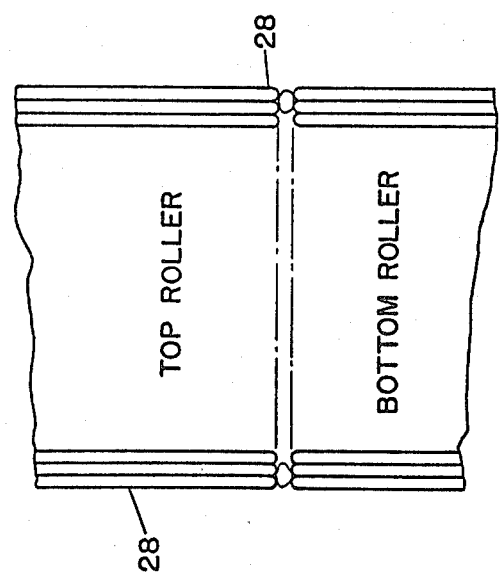
FIG. 3 is a somewhat schematic view of a pair of counter-rotating rollers, and illustrates the manner in which the peanuts are gripped therebetween while passing through the blanching arrangement.
Figure 5:
FIG. 5 is a sectional view across the nut feeding tray illustrating the grooved feed surface thereof.
Figure 2:
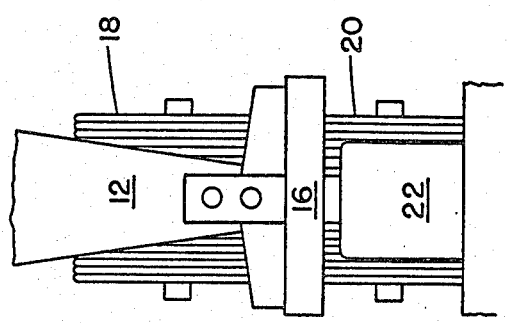
FIG. 2 is an end view of the arrangement, illustrating a hopper nut feed into a vibratory grooved tray which directs the peanuts to be blanched between the counter-rotating rollers.

The grooved tray 16 may have rounded grooves as illustrated in FIG. 5 or may have a sawtooth type of surface. It can be constructed of a suitable plastic such as Nylon, and may be vibrated by a commercially available vibrating unit 22. Each groove in the tray feeds nuts to a product lane formed by four adjacent tubular rings, two on each roller. The particular ribbed construction of the tray allows singulation and alignment of the nuts as they approach the opening created by four tubular rings, in a manner as illustrated schematically in FIG. 3. The four tubular rings encapsulate the nuts as they travel between the top and bottom rollers, and the differential roller speed results in a shearing action which causes the outer skin to peel away from the nut meat. The tubular rings provide a gentle holding action for the nuts because of the ability of their elastic walls to absorb the shock pressures exerted on the nuts by the different speeds of the rollers and their spacing in relation to each other. This relatively gentle action reduces splitting of the nuts during the blanching operation of the machine.

The top and bottom rollers may be driven in a precise manner with a slight speed differential by a chain and sprocket drive arrangement, with the sprocket sizes of the top and bottom rollers being chosen to obtain the desired speed differential.

One particular embodiment of the present invention was constructed and successfully tested, and had the following characteristics. Twenty-six elastic tubular rings were positioned in twenty-six grooves around the periphery of each roller, thereby defining twenty-five product passage lanes in the grooves between adjacent tubular rings. Each tubular ring was a latex rubber tube having a 7/16" outside diameter and a wall thickness of 3/32". It is contemplated that in alternative embodiments the outer diameter of the tubular rings might vary from that of the prototype embodiment, but would normally remain in the range between ¼" and ¾". Furthermore, the wall thickness of each tube might also vary, depending primarily upon the particular type of latex or other resilient material from which the tubes are constructed, but would normally be in the range of from 1/16" to ¼". Furthermore, other types of resilient material, such as different types of plastic, might also be utilized for the composition of the resilient rings. Moreover, although the disclosed preferred embodiment utilizes tubular elastic rings around the counterrotating rollers, other embodiments may be constructed with solid elastic rings, and in one embodiment the elastic rings may be coil metal springs extending around the counter-rotating rollers.

The spacing between the counter-rotating rollers would be adjusted to accommodate nuts of various grades, sizes and skin thicknesses, although in the prototype embodiment the spacing between the outermost circumference of each of the rollers was approximately ¼". This spacing might be varied by changing the position of the shaft 30 of the top roller 18 in the direction of arrow 32, which adjustment might be facilitated by mounting the shaft 30 in frame members on opposite sides of the roller 18 having slots therein extending in the direction of arrow 32. The shaft 30 would be mounted between the frame members by nuts on opposite sides of the shaft, with the position of roller 18 along 32 being adjustable by simply loosening the mounting nuts, sliding the shaft in the slotted frame members, and retightening the mounting nuts.

In the prototype discussed herein, the top roller was driven in a counter-clockwise direction, as illustrated in FIG. 1, at a rate of 11 rpm, while the bottom roller 20 was driven in a clockwise direction, as shown in FIG. 1, at a rotational speed of approximately 9 rpm. Each of the rollers 18 and 20 had an outer diameter of approximately 15¾". Each of the grooves 26 had a 7/16" diameter to accomodate the 7/16" outer diameter of each tubular ring, and the twenty-six grooves were evenly spaced along a 12" width of each roller.

In a series of tests, the performance of the prototype of the present invention described above was compared with the performance of a prior art blanching arrangement currently in commercial use wherein nuts are passed between two counter-rotating rollers. In this known arrangement, the peripheral surfaces of the rollers are equipped with urethane pads, with the top roller being formed of 20 durometer urethane and the bottom roller being formed of 30 durometer urethane. One or both of the roller surfaces may be ribbed such that the nuts are forced between the ribs as they are processed through the blancher. In these tests, the prototype reduced split peanuts by 3%, reduced unblanched nuts by 1 or 2% depending upon the particular test, and increased the percentage of whole blanched, vacuum blend peanuts by either 5 or 6% depending upon the particular test run. Furthermore, it has been estimated that replacement of the urethane pads on a commercial nut blancher, which is part of the regular maintenance thereof, would cost approximately ten times the amount required for replacement of the tubular rings in a maintenance program, exclusive of labor costs.

In the practice of the present invention, the nuts to be blanched are normally subjected to prior conditioning by roasting or drying the outer skins thereof to a moisture content that causes the skin to loosen or slough off, away from the nut meat, by the gentle mechanical rubbing action which results from the tubular rings on the top and bottom rollers being driven at slightly different rotational speeds.

While one embodiment and several variations thereof have been described in detail herein, it should be appreciated that the teachings of the present invention encompass many other embodiments and variations as would be apparent to one of ordinary skill in this art.

What is claimed is:

1. A nut blanching arrangement, comprising first and second spaced, adjacent counter-rotating rollers between which the nuts are passed as they are blanched; and a plurality of elastic rings, having rounded cross sections, extending around the outer circumference of each said roller and being positioned adjacent to each other such that circumferentially extending grooves are formed between adjacent elastic rings, said elastic rings on the first roller being radially aligned with respect to the elastic rings on the second roller, said counter-rotating rollers being spaced apart from each other a sufficiently close distance such that nuts passing between the counter-rotating rollers are forced into grooves defined by adjacent elastic rings on one of said rollers while positioned in grooves defined by adjacent elastic rings on the other counter-rotating roller to thereby remove the outer skins of said nuts.

2. A nut blanching arrangement as claimed in claim 1, said elastic rings being hollow tubular rings.

3. A nut blanching arrangement as claimed in claim 2, each said tubular ring having an outer diameter in the range of between ¼" and ¾" and a wall thickness of between 1/16" and ¼".

4. A nut blanching arrangement as claimed in claim 3, each roller having a plurality of grooves formed about its outer circumference, each groove adapted to receive an elastic ring therein.

5. A nut blanching arrangement as claimed in claim 4, the grooves of the first roller being radially aligned with respect to the grooves of the second roller whereby the elastic rings of the first roller are radially aligned with respect to the elastic rings of the second roller.

6. A nut blanching arrangement as claimed in claim 5, said counter-rotating rollers being rotated at different peripheral rotational speeds.

7. A nut blanching arrangement as claimed in claim 6, including a grooved vibratory feeder tray having one feeder groove for each opening formed between adjacent elastic rings on said rollers.

8. A nut blanching arrangement as claimed in claim 1, each roller having a plurality of grooves formed about its outer circumference, each said groove adapted to receive an elastic ring therein.

9. A nut blanching arrangement as claimed in claim 8, the grooves of the first roller being radially aligned with respect to the grooves of the second roller such that the elastic rings of the first roller are radially aligned with respect to the elastic rings of the second roller.

10. A nut blanching arrangement as claimed in claim 1, said counter-rotating rollers being rotated as different peripheral rotational speeds.

11. A nut blanching arrangement as claimed in claim 1, including a grooved vibratory feeder tray having one feeder groove for each opening formed between adjacent elastic rings on a roller.

* * * * *